Figure 1:
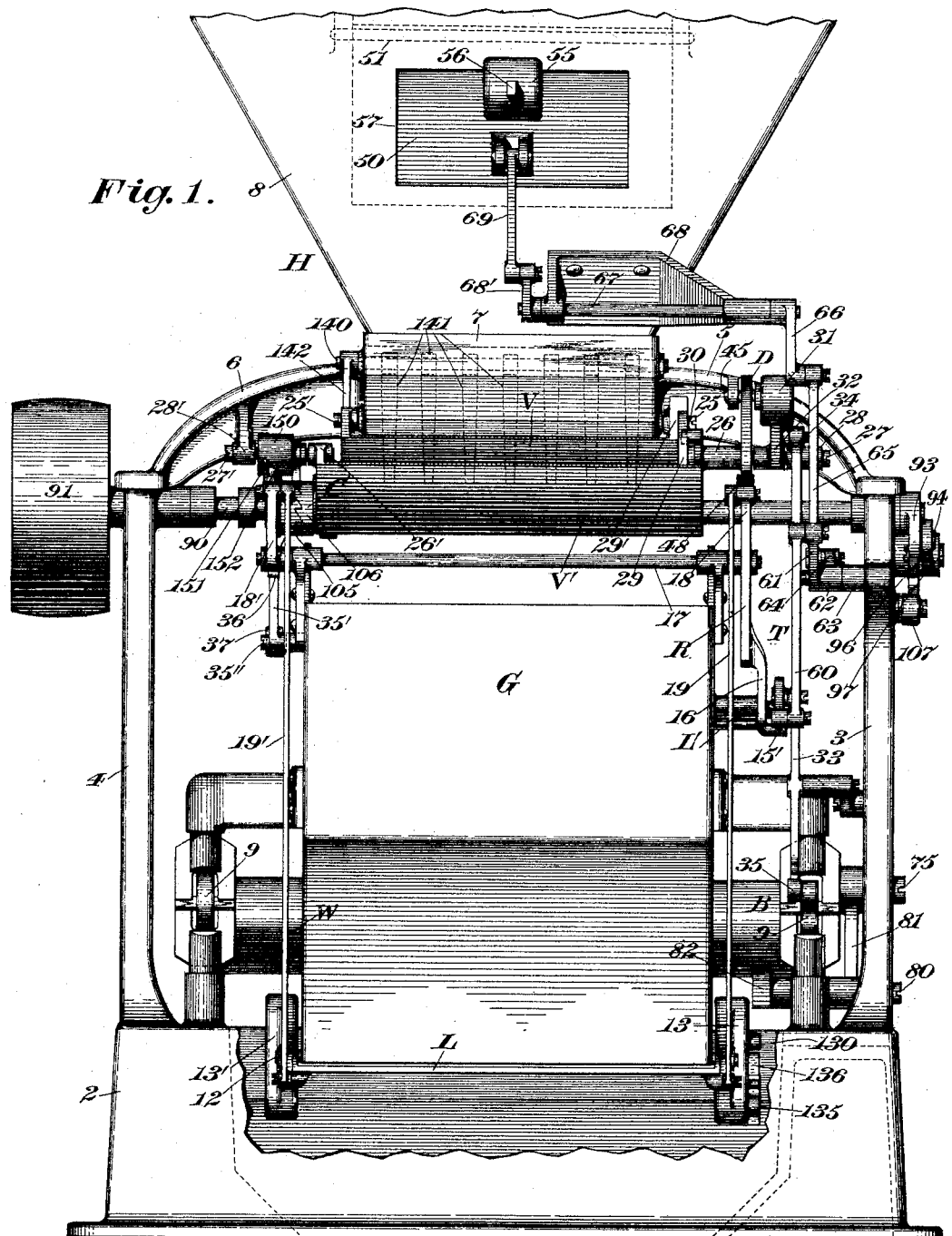

No. 616,853. Patented Dec. 27, 1898.
J. CHRISTIANSEN.
AUTOMATIC WEIGHING MACHINE.
(Application filed Mar. 17, 1898.)

(No Model.) 5 Sheets—Sheet 1.

Witnesses:
G. B. Rowley.
Fred. J. Dole.

Inventor;
John Christiansen,
By his Attorney,
F. H. Richards.

No. 616,853. Patented Dec. 27, 1898.
J. CHRISTIANSEN.
AUTOMATIC WEIGHING MACHINE.
(Application filed Mar. 17, 1898.)
(No Model.) 5 Sheets—Sheet 2.
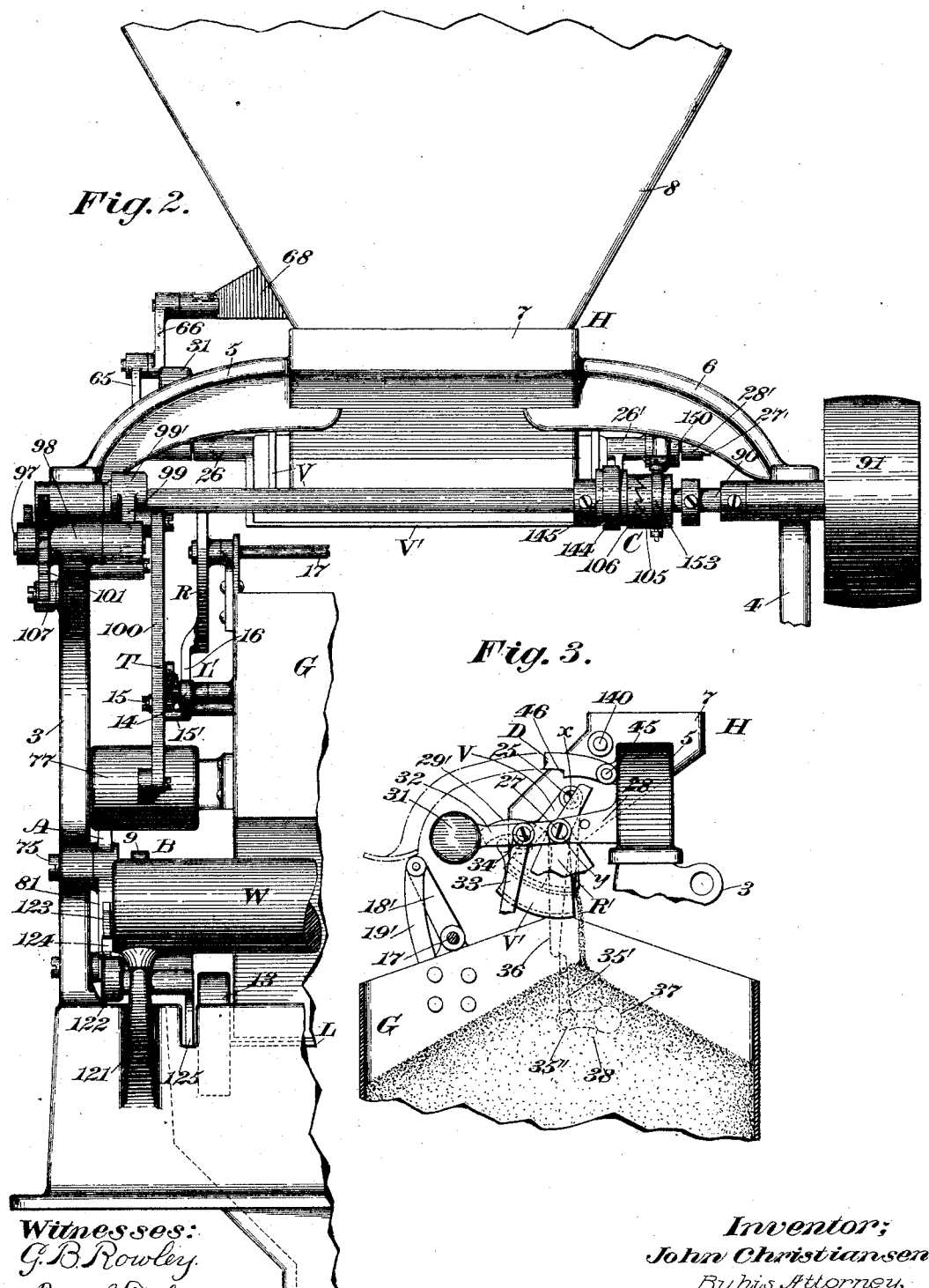
Witnesses:
G. B. Rowley.
Fred. J. Dole.
Inventor;
John Christiansen.
By his Attorney,
F. H. Richards.

No. 616,853. Patented Dec. 27, 1898.
J. CHRISTIANSEN.
AUTOMATIC WEIGHING MACHINE.
(Application filed Mar. 17, 1898.)

(No Model.) 5 Sheets—Sheet 3.

Witnesses:
G. B. Rowley.
Fred J. Dole.

Inventor:
John Christiansen
By his Attorney,
F. H. Richards.

No. 616,853. Patented Dec. 27, 1898.
J. CHRISTIANSEN.
AUTOMATIC WEIGHING MACHINE.
(Application filed Mar. 17, 1898.)

(No Model.) 5 Sheets—Sheet 4.

Witnesses:
G. B. Rowley.
Fred. J. Dole.

Inventor:
John Christiansen.
By his Attorney,
F. H. Richards.

No. 616,853. Patented Dec. 27, 1898.
J. CHRISTIANSEN.
AUTOMATIC WEIGHING MACHINE.
(Application filed Mar. 17, 1898.)
(No Model.)
5 Sheets—Sheet 5.

Witnesses:
G. B. Rowley.
Fred. J. Dole.

Inventor:
John Christiansen;
By his Attorney,
F. H. Richards

UNITED STATES PATENT OFFICE.

JOHN CHRISTIANSEN, OF HARTFORD, CONNECTICUT, ASSIGNOR TO THE PRATT & WHITNEY COMPANY, OF SAME PLACE.

AUTOMATIC WEIGHING-MACHINE.

SPECIFICATION forming part of Letters Patent No. 616,853, dated December 27, 1898.

Application filed March 17, 1898. Serial No. 674,180. (No model.)

*To all whom it may concern:*

Be it known that I, JOHN CHRISTIANSEN, a citizen of the United States, residing at Hartford, in the county of Hartford and State of Connecticut, have invented certain new and useful Improvements in Automatic Weighing-Machines, of which the following is a specification.

This invention relates to weighing-machines adapted for automatically weighing with rapidity and precision various kinds of material.

The invention involves, as one of its features and in combination with weighing mechanism and a supply apparatus, means for automatically stopping the operation of the weighing mechanism when the level of the material in the supply apparatus passes below a predetermined line. In the present case the discharge of the load from the load-receiver, constituting one member of the weighing mechanism, is controlled by means involving a latch, and the latch-tripper is thrown into an ineffective position by means including, preferably, a device controlled by the material constituting the supply—that is, the invention includes means, broadly, for throwing the load-discharging mechanism into an ineffective position when the level of the material in the supply apparatus passes below a safety-line.

Another object of the invention resides, in connection with weighing mechanism and with an actuator, of means, in combination with the weighing mechanism, for setting the actuator, and a member, such as a stream-controller, located for operation by the actuator. Said actuator is preferably thrown into connection with a continuously-driven power device of suitable character, which sets the same into an effective position to operate the stream-controller or to augment the effect of the beam mechanism, which serves as a primary actuator, the secondary or power-operated actuator being maintained in its shifted position by a detent, which is tripped on the complete discharge of the load, whereby the stream-controller or other member can be retracted to permit the supply to enter the empty load-receiver.

Another object of the invention is to combine with the stream-supplying means a pair of stream-controllers supported for advancing and retracting movements in the same direction and movable about different axes, and means operative with one stream-controller for controlling the operation of the other stream-controller.

The stream-controllers consist, preferably, of pan-valves, and I mount upon one of them a stop, which is engaged by the other valve for a predetermined period during the advancing movement of said valves or up to the commencement of the drip or poising period. At about this time the lower valve passes out of contact with the stop and can be promptly operated to cut off the supply, and during the first period of operation of the valves the lower or supplemental valve does not come in contact with the material, whereby on its final movement it can be operated without undue resistance from the drip-stream.

My improved machine includes interlocking-stops operative with the supply and discharge mechanisms, which include, respectively, a valve and a closer or equivalent device, and these stops are connected with the valve and closer, respectively, and are constructed and operated in the manner indicated in Letters Patent No. 548,840, granted October 29, 1895, to Francis H. Richards; and for the purpose of insuring the prompt shutting of the closer on the discharge of a load I provide means for positively holding the two interlocking stops out of contact, by reason of which the stop that is operative with the valve cannot impede the operation of the coöperating stop, and consequently of the closer.

Figure 4:
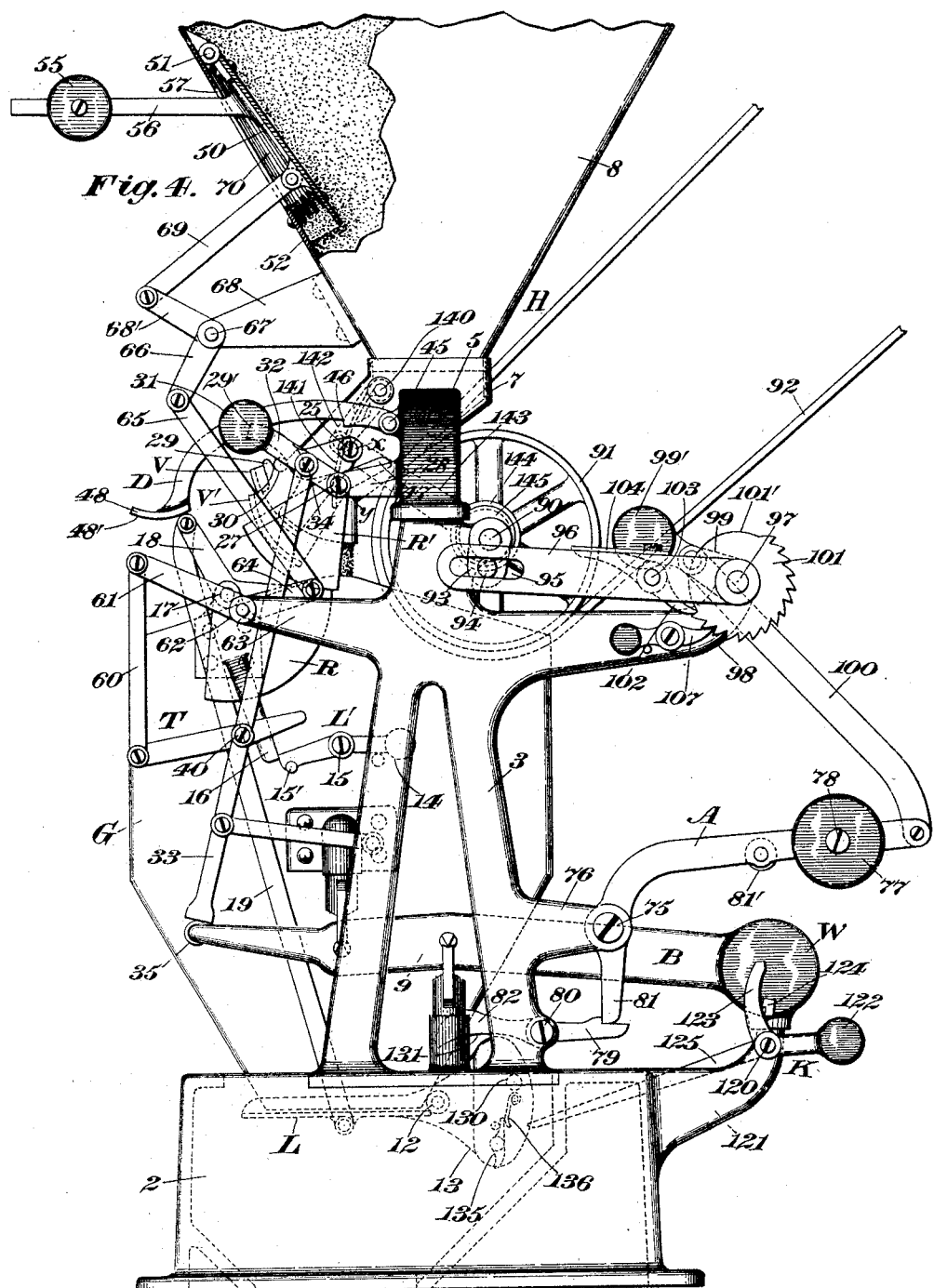
Figure 5:
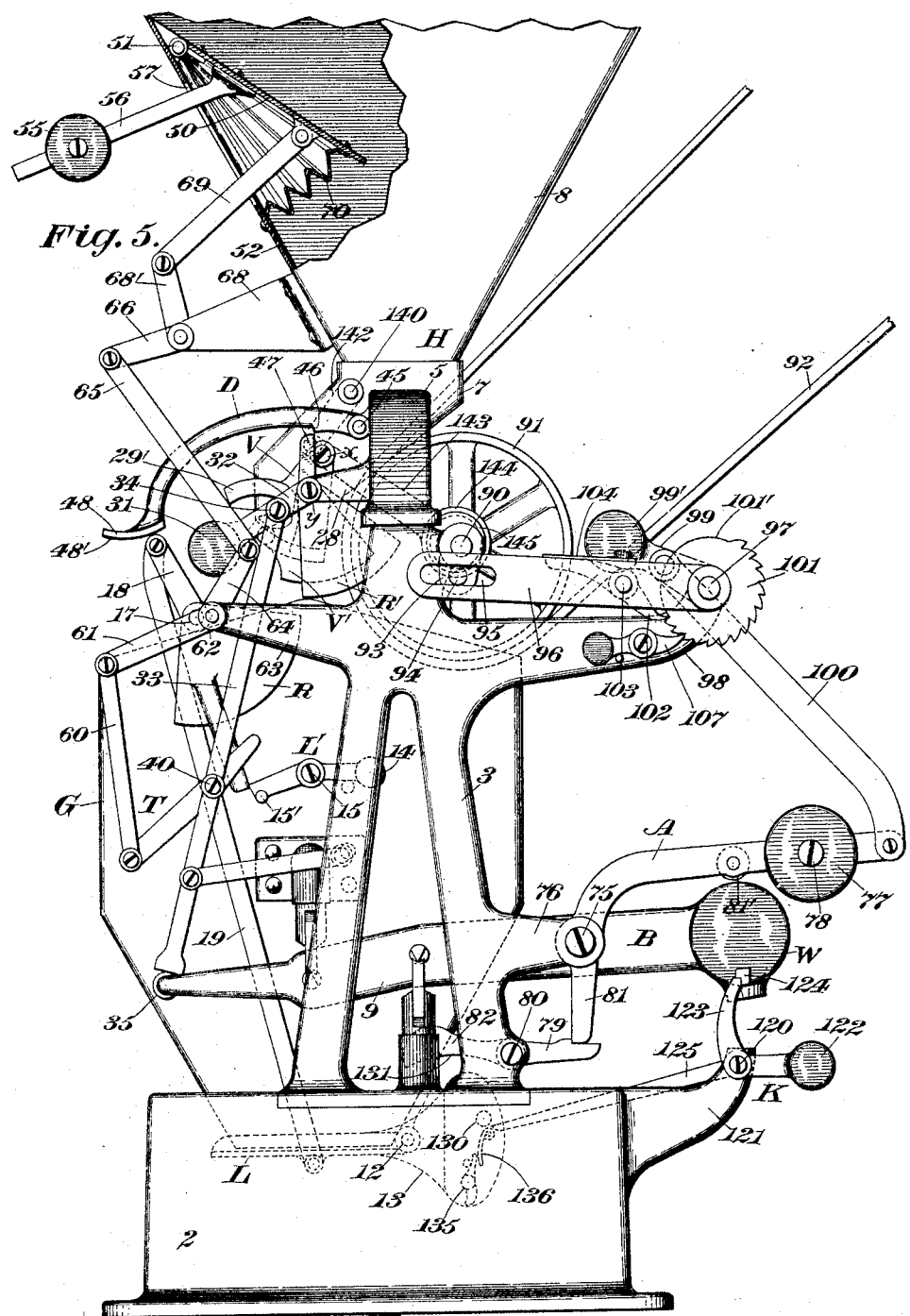
Figure 6:
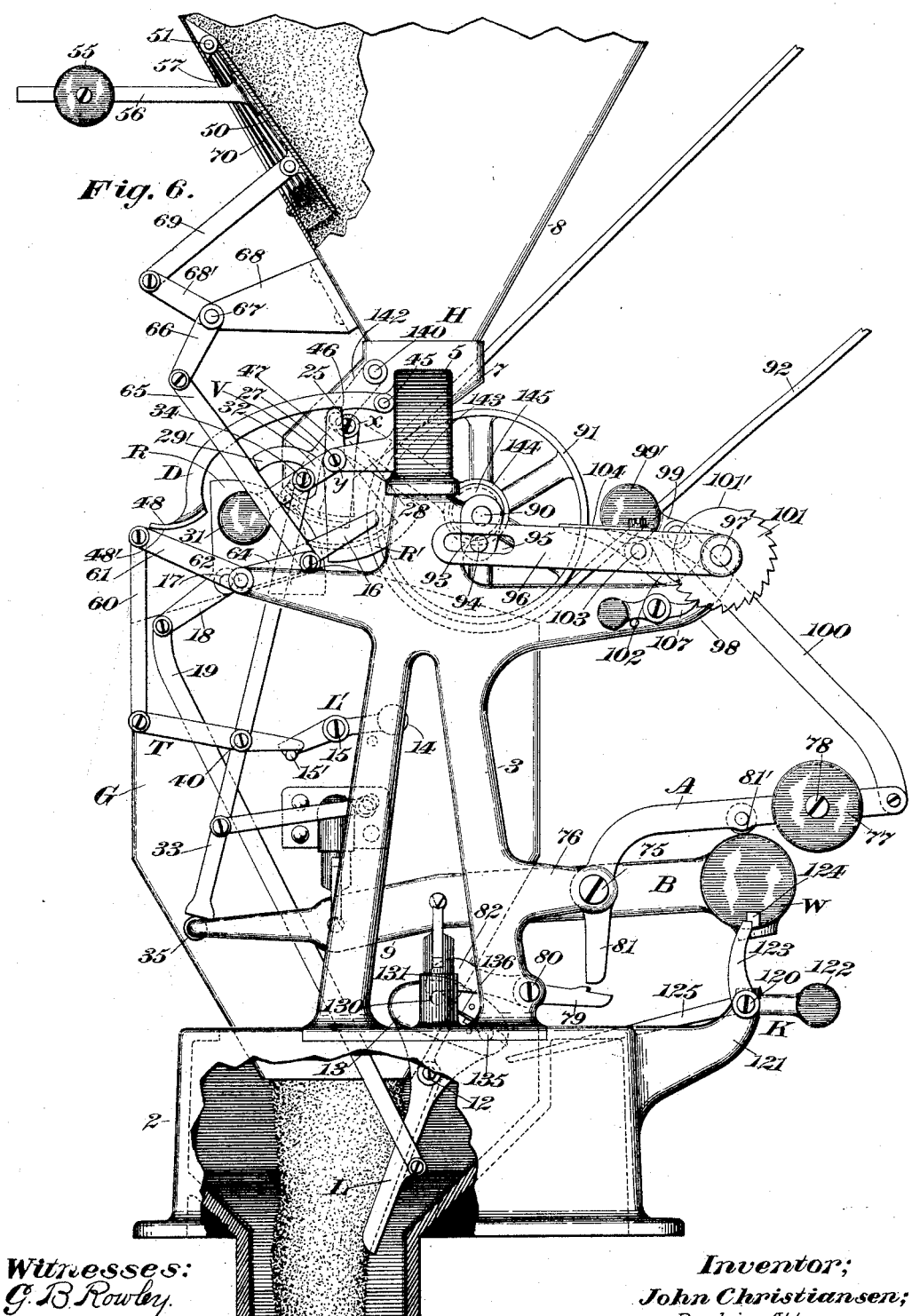

In the drawings accompanying and forming part of this specification, Figure 1 is a front elevation of my improved weighing-machine. Fig. 2 is a rear elevation showing the upper and left-hand side of the machine. Fig. 3 is a sectional detail of the valve and valve-locking mechanism; and Figs. 4, 5, and 6 are side elevations, as seen from the right in Fig. 1, showing the positions occupied by the different parts during the making and discharging of a load.

Similar characters designate like parts in all the figures of the drawings.

The framework for supporting the different parts of the mechanism consists of the chambered base 2, the columns 3 and 4 mounted thereon, and the brackets 5 and 6 extending oppositely from the supply apparatus II, constituting a convenient means for delivering a stream of material to the load-receiver of the weighing mechanism, said supply apparatus consisting of the hoppers 7 and 8, the hopper 8 being mounted upon and secured to the smaller hopper 7, which is located directly over the load-receiver.

The weighing mechanism consists of a load-receiver, as G, and a supporting scale-beam therefor, as B, mounted upon the base 2 and consisting of a pair of arms, as 9, joined by the cylindrical counterweight W, the load-receiver being sustained upon the poising end of the two beam-arms, and the mounting of the beam upon the base 2 and the load-receiver upon the beam is in the usual manner, and hence a detailed description thereof is unnecessary.

The discharge of the loads from the load-receiver is controlled by a closer, as L, pivoted, as at 12, to the load-receiver, and counterweighted, as at 13 and 13', respectively, at its opposite sides, the counterweight serving to shut the closer on the discharge of a load.

The means for holding the closer shut includes a latch, as L', counterweighted, as at 14, and pivoted, as at 15, to the load-receiver, the working end of the latch being adapted to engage the arm 16 of the rocker R, fixed to the rock-shaft 17, mounted upon the load-receiver, said rocker having an arm 18, to which the rod 19 is pivoted, said rod being likewise connected at its opposite end with the closer L. The shaft 17 is equipped at its opposite end with the crank-arm 18', connected by the rod 19' with the closer L, and the arms 18 and 18' and 19 and 19' move, respectively, in parallelism as the closer opens and shuts.

The main or large hopper 8 contains, substantially, a mass of material equal to the capacity of the load-receiver G, and it delivers the material into the hopper or chute 7, which supplies it in the form of a stream to the load-receiver, the stream being controlled, preferably, by a pair of valves, as V and V', located one above the other and reciprocatory in the same direction, the two valves advancing together for a predetermined period, during which time the auxiliary valve does not come in contact with the supply-stream. When the load is completed, the auxiliary valve is shut, and as it does not sustain any of the material it can be closed at an accelerated speed to cut off the drip-stream.

The upper or main valve V (see Fig. 1) is adapted to receive the pivots 25 and 25', fitting in bearings upon opposite sides of the hopper 7, and the valve V' is provided with the lateral projections 26 and 26', in which the pivots 27 and 27', respectively, are driven, said pivots being supported by bearings or hubs, as 28 and 28', on the brackets 5 and 6, respectively.

The axes of the valves which are superposed are designated, respectively, by $x$ and $y$, (see Fig. 3,) and the valve V (see Fig. 1) is provided with a stop or offset 29, adapted to be engaged by the adjacent lateral projection 30 upon the valve V' at the commencement of operation, whereby the two valves will be caused to advance in unison for a predetermined time, an actuator being connected with one of the valves, as the valve V'. Said actuator consists, preferably, of a counterweight 31, fixed to the arm 32, extending forward from the valve-pivot 27 and exerting a normal valve-closing tendency, which is checked by the beam B, acting through the intermediate rod 33, pivoted, as at 34, to the actuator-arm 32 and resting at its free end upon the projection or antifriction-roll 35 upon the beam.

At the commencement of operation, as indicated in Fig. 4, the projection 30 is represented in engagement with the offset 29, and the full volume of the supply-stream is shown flowing into the empty load-receiver G. When a certain proportion of the load has been received by the load-receiver G, it, with the inner end of the beam B, will descend, thereby permitting the weight 31 to drop and to advance the valve V', and the projection 30 on said valve being in engagement with the offset 29 the valve V will be swung under the outlet of the hopper 7 to reduce the volume of the supply-stream to a drip, as indicated in Fig. 3, at which time the projection 30 will have passed out of contact with the offset 29 on the valve V, whereby the valve V' can be promptly closed at the proper time; but it is preferably held against final movement by suitable means, as by the by-pass stop 35', of ordinary construction, adapted to be engaged by the depending rod or finger 36, fixed to the valve-pivot 27, the rod being adapted to strike the by-pass stop 35' when the load is nearly completed. The by-pass stop is pivoted, as at 35'', upon the load-receiver and its weighted arm 37 rests upon the stop 38 upon said load-receiver. When the load is completed, the by-pass stop will pass off the rod 36, thereby freeing the same, so that the weight 31 can drop to swing the valve V' across the path of the drip-stream, and thereby stop the entrance of material into the loaded load-receiver.

On the cut-off of the supply-stream the closer L is released and is forced open by the weight of the material in the load-receiver, and the valves V and V' are simultaneously locked against opening movement, as will hereinafter appear, while the closer is open, the beam B being also locked.

When the load is completely discharged, the closer shuts and the valve mechanism is released, as is also the beam, and as the latter returns to its primary position its effect is augmented by a power-operated actuator, hereinafter more particularly described, so that an upward thrust is applied by the beam to the rod 33 for swinging the valve V' open, and the projection or pin 30 will engage the curved arm 29' on the side of the main valve V to open the latter in unison with its companion.

My present machine includes reciprocally-effective stops, operative, respectively, with the valve mechanism and with the closer, the rocker R constituting one of said stops, while the coöperating stop is designated by R' and is affixed, preferably, to the pivot 27, and each consists of a segmental plate.

In Fig. 4 the valves V and V' are represented wide open and the closer L shut and held shut by the latch L', in engagement with the arm 16 of the rocker or stop R. Said rocker or stop is shown contiguous to the curved face of the coöperating stop R', so that in case the latch L' should be tripped the rocker can move for a short distance or until it abuts against the stop R, which resists further movement thereof, whereby the closer is prevented from opening. When the supply-stream is cut off by the valves, the stop R' will have crossed the path of the coöperating stop R, so that the latter will be released and can swing about its axis, provided the latch L' has been tripped, and as the stop R thus operates it crosses the path of the stop R', as shown in Fig. 6, thereby to prevent retractive movement of said stop R' and also of the valve mechanism. On the shutting of the closer the stop R releases its companion R'.

The tripper for the latch L' consists, preferably, of a lever T, pivoted, as at 40, to the thrust-rod 33, the working end of said lever being adapted on the completion of the load normally to impinge against the pin 15' on the latch L' and disengage said latch from the arm 16, whereby the closer can be forced open to discharge the load.

In connection with the interlocking stops R and R', I provide means for holding the stop R' out of engagement with the coöperating stop R on the return movement of the latter, whereby the operation cannot be retarded, by reason of which the closer L is permitted to shut promptly when the last part of the discharging load has passed therefrom, and the means consist in the present case of a self-active detent adapted to engage a member connected with the valve mechanism to hold the same, and consequently the stop R, operative therewith in their extreme advanced positions.

The detent for preventing the temporary retraction of the valve mechanism and the stop R' therewith is designated by D, and consists, preferably, of a lever pivoted, as at 45, to the framing of the machine and having a shoulder 46 adapted to drop over the coöperating arm 47, fixed to the valve-pivot 27, when the valve mechanism reaches its extreme forward position and when the closer L is opened, as indicated in Fig. 6, the gravitative detent or lever D being disengaged from the arm 47 when the closer shuts.

The detent or lever D terminates in a foot 48, the under curved face 48' of which is normally engaged by the arm 18 of the rocker R, as shown in Fig. 4.

When the load-receiver descends, the arm 18 moves therewith, thereby permitting the lever D to drop a corresponding distance, the valve mechanism in the interim having reached its extreme forward position. When the closer opens, the rod 19 is drawn downward, thereby swinging the arm 18 to the left and downward, as shown in Fig. 6, and moving it out of contact with the curved face 48' at the end of the lever D, so that the shoulder 46 thereof can drop into engagement with the arm 47. When the closer shuts, the motion just described will be reversed, and when the arm 18 has nearly reached its primary position it will engage the curved face 48' on the detent and raise the latter out of engagement with the arm 47, thereby releasing the valve mechanism, and consequently the beam B, so that the latter can return to its initial position, and as the beam drops its effect will be augmented by an independent actuator, thereby to resist the tendency of the inflowing supply-stream to force the empty load-receiver downward.

It is important that the supply apparatus H should contain a mass of material substantially equaling the capacity of the load-receiver G, as in case it does not there are times when the drip-supply is below the normal or standard, in which case such drip-stream is sufficient to carry the load-receiver down and to cause the discharge of an underload, and to prevent such a contingency as this I provide automatic mechanism for throwing the weighing mechanism out of action when the supply of material in the main hopper 8 passes below a safety-level, and the means preferably shift the latch-tripper T into a position where it cannot engage the latch-pin 15' on the descent of the load-receiver, and the throw-out means includes, preferably, a device held in its normal position by the mass of material in the main hopper.

In the ordinary types of weighing-machines there are times when the supply apparatus contains nearly but not quite a complete bucket-load. In such a case as this when the supply-valve is opened the main stream will commence to flow from the supply apparatus and will furnish about nine-tenths of the load, after which the bucket commences to descend, which operation permits the valve to close to a drip position and causes the flow of the drip-stream for topping off the load, and it will of course be understood that the drip-stream which flows from the supply apparatus is somewhat below the standard; but even though it may be it can exert a sufficient force to carry the bucket to the limit of its descent and cause the discharge of the bucket contents. In such a case the discharge of an underload will result, though of course the error is slight as compared with the amount of the total load. By my improvements, however, this error cannot occur, as the moment the supply apparatus contains anything less than the standard load the automatic mechanism before referred to is rendered effective for throwing the load-discharging mechanism out of action, so that when the load-receiver reaches the poising-line the latch controlling the discharge of the load cannot be tripped.

The device acted upon by the material constituting the supply consists, preferably, of a flat plate 50, pivoted, as at 51, within the hopper 8, near the upper forward side thereof and adjacent to the forward wall 52 of said hopper when in its primary or ineffective position. (Represented in Fig. 4.)

The plate 50 is shifted, when the hopper 8 contains less than the maximum capacity of the load-receiver G, by gravitative means, such as the weight 55, adjustable on the arm 56, fixed at its inner end to the plate 50 and extending through the opening 57 in the front wall 52 of the hopper, the opening being of a length to permit the free movement of the weight-carrying arm 56.

As soon as the weight 55 overcomes the pressure of the material applied to the plate 50 it can drop, thereby, through intermediate connections, throwing the latch-tripper T into an inoperative position to prevent the discharge of an underload.

A link is shown at 60, pivoted to the outer end of the tripper T and also to the arm 61 of the angle-lever 62, pivoted upon the bracket 63 of the framework, the arm 64 of said angle-lever being pivoted to one end of the link 65, likewise attached to the crank-arm 66 on the short rock-shaft 67 on the bracket 68, extending forward from the hopper 8, the opposite end of said shaft carrying the crank-arm 68', to which the link 69 is pivoted, the opposite end of the link being pivoted to the plate 50. When the weight 55 drops, the inner or working end of the tripper-lever T, through the intermediate linkage and other connections just specified, is raised, so that when the load-receiver descends the latch-tripper cannot come in contact with the pin 15' on the latch L'.

To prevent access of the material in the hopper 8 to the pivots of the blade 50 and from passing from beneath said plate, I connect the same with the inside of the hopper by flexible or analogous guards 70, secured to the opposite sides of the plate and to the adjacent portions of the hopper.

My improved machine illustrated includes an actuator supported independently of the weighing mechanism and serving to aid the beam in opening the valves V and V', the beam constituting a primary actuator and applying a thrust directly to the rod 33, which is communicated to the valve mechanism. The secondary actuator is designated by A, and it consists of a lever pivoted, as at 75, to the arm 76 on the framework and adapted to be thrown into operative relation with continuously-operative power-driven mechanism, so as to be shifted thereby into its operative position to augment on its working stroke the effect of the beam B, said lever carrying the weight 77, adjustable thereon and maintained in an adjusted position by the set-screw 78.

The weighted arm of the actuator A is elevated a slight distance beyond the limit of ascending movement of the beam-weight and when shifted is engaged by a detent, such as 79, pivoted, as at 80, to the framework, and the working end of the detent is thrown into engagement with the arm 81 of the actuator A by the weight 82 at one end thereof. When the detent is disengaged from the lever A, the lever can drop until it strikes the weight W of the beam B, which at this time is locked against return movement, as will hereinafter appear. When the beam B is released, the weight W thereon can drop, as can also the weight 77 of the actuator, whereby the combined effect of the two members will be transmitted to the valve mechanism through the intermediate rod 33.

The actuator A is elevated, where it can be engaged by the detent 79, by connections operated from the power-shaft 90, supported upon the framework and preferably carrying a clutch C, controlled from the valve mechanism and provided with a driver 91, consisting of a pulley connected by a belt 92 with a motor, (not shown,) the clutch serving to throw the shaft into and out of action.

The shaft 90 has at one end thereof the crank-arm 93, having the pin 94, extending through the longitudinal slot 95 of the pitman 96, the opposite end of which embraces the short rock-shaft 97, mounted upon the bearing 98, said shaft being provided at its opposite side with the arm 99, to which the rod 100 is pivoted, said rod being likewise connected at its opposite end with the extreme outer end of the actuator A.

The shifting mechanism for the actuator A involves a ratchet, as 101, fixed to the shaft 97, the operating-pawl therefor being designated by 102 and being pivotally mounted, as at 103, upon the pitman 96, and the ratchet is held in engagement with the teeth of the ratchet by the spring 104, fixed to the pitman.

When the two members 105 and 106 of the clutch C are in engagement, as shown in Fig. 2, the shaft 90 will be rotated from the continuously-operative pulley 91, thereby, through the pin 94 and crank-arm 93 on the end of the shaft, rapidly reciprocating the pitman 96, with the shaft 97 as a center, and the point of the pawl being in engagement with the teeth of the ratchet 101 said ratchet will be rotated to set the actuator A. The arm 99 carries a weight 99', serving to throw the same over a dead-center line just before the actuator A reaches its highest and latched position.

The ratchet 101 has a portion of its periphery plain, as at 101', and is held against retractive movement by the weighted detent 107, pivoted to the bearing 98. When the actuator A has been set, the ratchet will have been rotated sufficiently far to carry one end of the plain face 101' of the ratchet into contact with the operating-pawl 102, so that said actuator can freely drop. At the moment the valve is opened the point of the pawl 102 will be between the first two teeth of the ratchet, and the shaft 90 being in motion the ratchet through the intermediate parts will be rotated until the portion 101' thereof is again opposite the point of the pawl, as shown in Fig. 4, at which time the arm 81 of the actuator is engaged by the detent 79 to hold the actuator in its shifted position and the roll 81' thereof a slight distance above the highest point reached by the weight W. When the load is completed, the beam will be locked against return movement by a suitable locking device, and on the opening of the closer the detent 79 will be tripped, thereby permitting the roll 81' to drop against the weight W, as shown in Fig. 6, so that when the beam-locking device is tripped the weights 77 and W can freely fall to operate the valve mechanism.

The locker for preventing the return of the beam is designated by K, and it consists of a lever pivoted, as at 120, to the bearing 121 and having a weighted arm 122, the weight of which serves to throw and to hold the arm 123 in engagement with the offset 124 on the beam-weight W. The locker K is in the nature of a self-operative device, the arm 123 thereof being automatically forced under the offset 124 by the weight 122' when the beam-weight reaches the limit of its ascending movement, as shown in Fig. 6. The arm 123 is disengaged from the offset 124 by a blow upon the longitudinal arm 125 of the locker.

The lockers or detents 79 and K for the actuator and the beam B, respectively, are successively tripped, and preferably by means operative with the closer, the detent 79 being tripped on the opening of the closer, while the detent or locker K is tripped on the return movement of said closer.

On the completion of the load the parts will be in the positions shown in Fig. 5, and the closer-shutting weight 13 is provided with a drop device 130, adapted upon the opening of the closer to ride along the curved face 131 of the weighted arm 82 of the detent, thereby to disengage said detent from the arm 81 of the actuator A, whereby the weight 77 of said actuator can drop until the roll 81' strikes the beam-weight W, the distance traversed by the actuator A being only far enough to prevent its engagement by the detent 79 on the shutting of the closer, as shown in Fig. 6.

The tripper for the detent or locker K is designated by 135, and it consists of a spring-actuated by-pass, the spring being designated by 136. On the opening of the closer the by-pass device 135 strikes the free end of the locker-arm 125, but does not operate the same. On the return of the closer, however, and when the latter is nearly shut, the by-pass 135 will strike the arm 125 and will disengage the locking-arm 123 from the beam-weight W, and the actuator A, having been previously released, as is also the valve mechanism, the said actuator and beam can return to their initial positions to open the valve mechanism through the intermediate rod 33. As soon as the beam-weight W reaches its primary position the mechanism for operating the actuator A is set in operation to elevate said actuator to the position where it can be engaged by the detent 79 to be tripped on the opening of the closer.

To loosen up the supply of the hopper 7 and assure a freer feed of the stream, I mount in the same a stirrer or shaker consisting of a shaft 140 and a series of bars or fingers 141, extending downwardly therefrom, the shaft 140 being reciprocated by connections with the shaft 90, so as to vibrate the fingers 141 to carry out the object sought. One end of the shaft 140 extends beyond the hopper 7 and carries a crank-arm 142, to which the pitman 143 is pivoted, said pitman being provided at its opposite end with a ring 144, embracing the eccentric 145 upon the power-shaft 90, so that when the latter is operated the shaft 140 and the fingers 141 thereof will be rapidly reciprocated to loosen up the supply. The shaft 90 is thrown out of operative relation with the driving-pulley 91 on the completion of the load and preferably by means operative with the valve mechanism, the valve-pivot 27' carrying a shifting device 150, which serves to throw the clutch member 105 out of engagement with the clutch member 106. The clutch-shifting device 150 consists of a cylinder having a cam-slot 151, in which the pin 152 on the split ring 153 is disposed, said ring lying in an annular groove on the clutch member 105.

The operation of the hereinbefore-described machine is as follows: Fig. 4 shows the positions occupied by the different parts at the commencement of operation, the valves V and V' being wide open and the closer L being shut and held by the latch L', which is in engagement with the arm 16 of the rocker R, and the actuator A being in its shifted position, being held by the detent 79. The valves being wide open, the full volume of the supply-stream can enter the empty load-receiver, and when a predetermined part of the load has been received said load-receiver will descend with the beam, and the projection 35 of said beam falling away from the rod 33 will permit the weight 31 to drop to close the valves V and V' in the manner hereinbefore set forth. On the completion of the load the tripping-lever T will strike the pin 15' on the latch L', thereby releasing the closer L, which is forced open, and the pin 130 of which disengages the detent 79 from the actuator A, so that it can drop against the beam B, as shown in Fig. 6. On the shutting of the closer the by-pass device 135 strikes the arm 125 of the detent or rocker A and disengages said detent from the beam-weight W, whereby the beam and actuator can drop to apply the thrust-rod 33 for opening the valves V and V', and when the valves are opened the operation will be repeated and the actuator A will be set in the manner hereinbefore described.

Having described my invention, I claim—

1. The combination, with weighing mechanism, of a supply apparatus; means including a latch for controlling the discharge of the load; a latch-tripper; and means operative with the supply apparatus and acting, when the level of the material in the supply apparatus passes through a predetermined line, to shift the tripper into an inoperative position.

2. The combination, with weighing mechanism, of a supply apparatus; a shiftably-mounted device held in its ineffective position by the mass constituting the supply; means for shifting said device when the material passes below a predetermined level; mechanism including a latch for controlling the discharge of a load; and a latch-tripper connected with said shiftably-mounted device.

3. The combination, with weighing mechanism, of a supply apparatus; load-discharge-controlling means for the weighing mechanism, including a latch-tripping lever; a shiftably-mounted device held in its ineffective position by the material constituting the supply; and gravitative means in position for operating said shiftably-mounted device when the level of the material in the supply apparatus passes below a predetermined level.

4. The combination, with weighing mechanism, of a supply apparatus; a plate pivotally supported in the supply apparatus; a weighted arm secured to the plate and adapted to shift the same when the material in the supply apparatus passes below a predetermined level; and means connected with the plate for stopping the operation of the weighing mechanism when the plate is shifted.

5. The combination, with weighing mechanism, of a supply apparatus including a valve; a plate shiftably mounted in the supply apparatus; means including a latch for governing the discharge of the load; a rod connected with the valve mechanism and operated by the weighing mechanism; a tripper for the latch, mounted on said rod and connected with said plate; and means for shifting said plate when the level of the material in the supply apparatus passes below a predetermined line.

6. The combination, with weighing mechanism and with load-discharge-controlling means therefor, of a supply apparatus including a stream-controller; means for advancing the stream-controller; reciprocally-effective interlocking stops operative, respectively, with the stream-controller and with the load-discharge-controlling means; and instrumentalities for holding the stop operative with the stream-controller out of contact with the coöperating stop on the retraction of the latter.

7. The combination, with weighing mechanism including a load-receiver provided with a closer, of stream-supplying means; valve mechanism for controlling the supply; means for operating the valve mechanism; reciprocally-effective interlocking stops operative, respectively, with the valve mechanism and with the closer; and instrumentalities for holding the stop operative with the stream-controller out of contact with the coöperating stop on the retraction of the latter.

8. The combination, with weighing mechanism and with load-discharge-controlling means therefor, of a supply apparatus including a stream-controller; means for advancing the stream-controller; reciprocally-effective interlocking stops operative, respectively, with the stream-controller and with the load-discharge-controlling means; and a self-operative device adapted to engage the valve mechanism when the latter is in its extreme advanced position.

9. The combination, with weighing mechanism and with load-discharge-controlling means therefor, of a supply apparatus including a stream-controller; means for advancing the stream-controller; reciprocally-effective interlocking stops operative, respectively, with the stream-controller and with the load-discharge-controlling means; and instrumentalities controlled by the load-discharge means for holding the stop operative with the stream-controller out of contact with its companion on the reciprocation of the latter.

10. The combination, with weighing mechanism and with load-discharge-controlling means therefor, of a supply apparatus including a stream-controller; means for advancing the stream-controller; reciprocally-effective stops operative, respectively, with the stream-controller and with the load-discharge-controlling means; and instrumentalities mounted upon the framework and in position and adapted for holding the stop that is operative with the stream-controller out of contact with the coöperating stop on the retraction of the latter.

11. The combination, with weighing mechanism and with load-discharge-controlling means therefor, of a supply apparatus including a stream-controller; means for operating the stream-controller; reciprocally-effective stops operative, respectively, with the stream-controller and with the load-discharge-controlling means; and a gravitative device in position and adapted for holding the stop that is operative with the stream-controller out of contact with the coöperating stop on the retraction of the latter.

12. The combination, with weighing mechanism and with load-discharge-controlling means, of a supply apparatus including a stream-controller; means for operating the stream-controller; reciprocally-effective stops operative, respectively, with the stream-controller and with the load-discharge-controlling means; and a lever pivotally mounted upon the framework in position and adapted for engaging and holding the stop that is operative with the stream-controller out of contact with the coöperating stop on the retraction of the latter.

13. The combination, with weighing mechanism including a load-receiver provided with a closer, of a rocker mounted upon the load-receiver and provided with an arm connected with the closer; valve mechanism; and gravitative means for engaging the valve mechanism, said means being held in its ineffective position by the arm of the rocker and while the closer is shut.

14. The combination, with a load-receiver, of a scale-beam therefor; stream-supplying means; a pair of stream-controllers supported for advancing and retracting movements in the same direction and movable about different axes, and one of which constitutes a main stream-controller and the other constitutes an auxiliary stream-controller; a stop on the main stream-controller, adapted to be engaged by the auxiliary stream-controller for a predetermined period; a weighted arm connected with the auxiliary stream-controller; and a rod jointed to said arm and operating against the scale-beam.

15. The combination, with stream-supplying means, of a pair of stream-controllers supported for advancing and retracting movements in the same direction and movable about superposed axes; means operative with one stream-controller for governing the operation of the other stream-controller; stream-controller-operating means; and means in position to stop the stream-controllers at the commencement of the poising period and for automatically releasing the same on the completion of the load.

16. The combination, with stream-supplying means, of a pair of pivotally-supported stream-controllers supported for advancing and retracting movements in the same direction and movable about superposed axes; means operative with one stream-controller for governing the operation of the other stream-controller; stream-controller-operating means; weighing mechanism including a load-receiver provided with a closer; a stop operative with the closer; and a coöperating stop connected with one of the stream-controllers and each of said stops being adapted to block the operation of the other.

17. The combination, with weighing mechanism, of a stream-controller; an actuator; continuously-operative driving mechanism independent of the weighing mechanism; and means for throwing the actuator into operative connection with said continuously-operative driving mechanism to shift the actuator in position to operate the stream-controller.

18. The combination, with weighing mechanism, of a stream-controller; an actuator; continuously-operative driving mechanism independent of the weighing mechanism; means for throwing the actuator into operative connection with said continuously-operative driving mechanism thereby to shift the actuator into position to operate the stream-controller; and means for holding the actuator in its shifted position and for subsequently releasing the same.

19. The combination, with weighing mechanism including a primary actuator, of stream-supplying means involving a valve in position to be operated by the primary actuator; a secondary actuator in position to augment the effect of the primary actuator; continuously-operative mechanism independent of the weighing mechanism for setting the secondary actuator; and means for holding the secondary actuator in its shifted position and for subsequently releasing the same.

20. The combination, with weighing mechanism, of stream-supplying means including a valve; an actuator for said valve, supported independently of the weighing mechanism; continuously-operative mechanism for setting the actuator; and a detent located to hold the actuator in its shifted position.

21. The combination, with weighing mechanism, of stream-supplying means including a valve; an actuator for said valve, supported independently of the weighing mechanism; continuously-operative mechanism for setting the actuator; a detent located to hold the actuator in its shifted position; and means for tripping the detent on the discharge of a load.

22. The combination, with weighing mechanism including a load-receiver provided with a closer, of stream-supplying means including a valve; an actuator for said valve, supported independently of the weighing mechanism; continuously-operative mechanism for setting the actuator; a detent located to hold the actuator in its shifted position; and means operative with the closer for tripping the detent.

23. The combination, with weighing mechanism including a load-receiver and a scale-beam serving as a primary actuator, of a stream-controller in position to be operated by the primary actuator; a secondary actuator serving to augment the effect of the scale-beam; mechanism for setting the secondary actuator; and detents for holding the scale-beam and the secondary actuator in their shifted positions.

24. The combination, with weighing mechanism including a load-receiver and a scale-beam serving as a primary actuator, of a stream-controller in position to be operated by the scale-beam or primary actuator; a secondary actuator serving to augment the effect of the scale-beam; mechanism for setting the secondary actuator; detents for holding the scale-beam and the secondary actuator in their shifted positions; and means for successively tripping said detents.

25. The combination, with weighing mechanism including a load-receiver provided with a closer and a scale-beam serving as a primary actuator, of a stream-controller in position to be operated by the scale-beam or primary actuator; a secondary actuator serving to augment the effect of the scale-beam; mechanism for setting the secondary actuator; detents for holding the scale-beam and the secondary actuator in their shifted positions; and means operative with the closer for successively tripping said detents.

26. The combination, with weighing mechanism including a load-receiver and a scale-beam serving as a primary actuator, of a stream-controller in position to be operated by the primary actuator; a secondary actuator serving to augment the effect of the scale-beam; mechanism for setting the secondary actuator; and self-active detents mounted on the framework for holding the scale-beam and the secondary actuator in their shifted positions.

27. The combination, with weighing mechanism, of stream-supplying means; a stream-controller; an actuator for said stream-controller, supported independently of the weighing mechanism; and mechanism including a pawl and a ratchet for setting the actuator.

28. The combination, with weighing mechanism, of stream-supplying means; a stream-controller; an actuator for said stream-controller, supported independently of the weighing mechanism; and mechanism including a pawl and a ratchet for setting the actuator, said ratchet having a portion of the teeth removed.

29. The combination, with weighing mechanism, of stream-supplying means; a stream-controller; an actuator for said stream-controller, supported independently of the weighing mechanism; a driving-shaft including a clutch; connections between the driving-shaft and the actuator for setting the latter; and means operative with the stream-controller for coupling and uncoupling the clutch members.

30. The combination, with weighing mechanism, of stream-supplying means; a stream-controller; an actuator for said stream-controller, supported on the weighing mechanism; a driving-shaft provided with a crank-arm having a pin; a pitman having a longitudinal slot to receive the pin; and means operated by the pitman for setting said actuator.

31. The combination, with weighing mechanism, of stream-supplying means; a stream-controller; an actuator for said stream-controller, supported independently of the weighing mechanism; a shaft having an arm connected with the actuator; a ratchet fixed to said shaft; a driving-shaft; a device connected with the driving-shaft and provided with a pawl for operating the ratchet; and means for holding the actuator in a shifted position.

JOHN CHRISTIANSEN.

Witnesses:
 FRED. J. DOLE,
 HENRY BISSELL.